United States Patent [19]
Zielinski

[11] Patent Number: 5,146,242
[45] Date of Patent: Sep. 8, 1992

[54] WRITING BEAM ANGULAR ALIGNMENT DEVICE

[75] Inventor: Erich Zielinski, Bergen, N.Y.

[73] Assignee: Eastman Kodak Company, Rochester, N.Y.

[21] Appl. No.: 670,088

[22] Filed: Mar. 15, 1991

[51] Int. Cl.⁵ ............................................. H04N 1/21
[52] U.S. Cl. .................. 346/108; 346/139 R
[58] Field of Search ............ 346/108, 107 R, 160, 346/139 R; 358/296

[56] References Cited

U.S. PATENT DOCUMENTS

| | | | |
|---|---|---|---|
| 4,149,798 | 4/1979 | McGowan et al. | 346/160 |
| 4,253,102 | 2/1981 | Kataoka et al. | 346/108 |
| 4,393,387 | 7/1983 | Kitamura | 346/108 |
| 4,607,167 | 8/1986 | Petric | 250/492.2 |
| 4,686,663 | 8/1987 | Kühn | 369/46 |
| 4,739,415 | 4/1988 | Toyono et al. | 358/296 |
| 4,905,026 | 2/1990 | Day | 346/155 |
| 4,918,300 | 4/1990 | Tsuji et al. | 250/201.1 |

*Primary Examiner*—Mark J. Reinhart
*Attorney, Agent, or Firm*—Robert L. Randall

[57] ABSTRACT

In an imaging apparatus comprising a rotating carrier member arranged to carry a writing element, with the carrier member having an axially extending indicia on the surface thereof, light producing means is provided which is movable with respect to the writing element and is projectable thereon to generate an image. The light producing means is arranged as a linear array in a housing member, with the housing member having an axis disposed substantially perpendicular to the axis of the carrier member. Means is provided for selectively angularly positioning the housing member and the linear array with respect to the carrier member. The positioning means comprises light sensing means disposed on opposite sides of the axis of the housing member in a predetermined relationship with respect to the linear array and facing the carrier member. The light sensing means is arranged to cooperate with the indicia to generate a signal to indicate that the linear array is disposed in a predetermined relationship with respect to the axis of the carrier member as the housing means is selectively rotated about its axis.

11 Claims, 3 Drawing Sheets

WRITING BEAM ANGULAR ALIGNMENT DEVICE

BACKGROUND OF THE INVENTION

1. Field of the Invention

The present invention relates to a color proofing apparatus which utilizes an electronic signal input, and more particularly, to a method and apparatus for providing a within array in a thermal printer with the preferred angular alignment with respect to the scanning angle on a rotating drum member.

2. Description of the Prior Art

Color proofing is the procedure used by the printing industry for creating representative images that replicate the appearance of printed images without the cost and time required to actually set up a high-speed, high-volume printing press to print an example of the images intended. Ideally, these representative images, or proofs, are generated from the same color-separations used to produce the individual color printing plates used in printing presses so that variations in the resulting images can be minimized. Various color-proofing systems have been devised to create the proofs and have included the use of smaller, slower presses as well as means other than presses, such as photographic, electrophotographic, and non-photographic processes.

The proofs generated are judged for composition, screening, resolution, color, editing, and other visual content. The closer the proof replicates the final image produced on the printing press, as well as the consistency from image to image, from press to press, and from shop to shop, the better the acceptance of the proofing system by the printing industry. Other considerations used in judging proofing systems include reproducibility, cost of the system as well as cost of the individual proofs, speed, and freedom from environmental problems. Further, since nearly all printing presses utilize the half-tone process for forming pictorial images, wherein the original image is screened, i.e. photographed through a screen to produce one or more printing plates containing an image formed of a plurality of fine dots that simulate the varying density of the original image, proofing processes that employ the half-tone process to form an image are more acceptable to the printing industry than are continuous tone systems.

In recent years a variety of processes have been developed and implemented to electronically form, store, and manipulate images both for the actual printing as well as the proofing of images. While such electronic systems can handle and produce analog images, the most widely used systems employ digital processes because of the ease of manipulation of such digital images. In each of these electronic processes it is possible to display the resulting image on a CRT display, but it is generally necessary to produce a "hard copy" (i.e. an image actually formed on a sheet of paper or other material) before it can be fully assessed for approval of the final printing operation. Thus, each of these electronic systems requires the use of some form of output device or printer which can produce a hard copy of the image for actual evaluation. It is to the field of proofing output devices that the present invention is directed.

While purely photographic processes can provide accurate reproductions of images, they do not always replicate the reproduction resulting from printing presses. Further, most photographic processes do not produce half-tone images that can be directly compared to the printed images the are supposed to simulate. Moreover, they are almost universally incapable of reproducing the images on the wide variety of paper or other material that can be run through-h a press. It is known that the appearance of the final printed image is affected by the characteristics of the paper or other material upon which it is printed. Thus, the ability to form the proof image on the material actually to be used in the press can be a determining factor in the selection of the proofing system.

Other continuous tone proofing systems, such as thermal processes and ink-jet systems have been developed, but they do not replicate the half-tone images so desired by the printing industry.

Electrophotographic proofing systems with half-tone capability have been introduced over the past few years which employ either wet or dry processes. The electrophotographic systems that use dry processes suffer from the lack of high resolution necessary for better quality proofing, particularly when the images are almost of continuous tone quality. This results from the fact that dry electrophotographic processes cannot employ toner particles which have a sufficiently small size to provide the requisite high- image resolution. While wet electrophotographic processes do employ toners with the requisite small particle size, they have other disadvantages such as the use of solvents that are environmentally undesirable.

In commonly assigned U.S. patent applications a thermal printer is disclosed which may be adapted for use as a direct digital color proofer with half-tone capabilities. This printer is arranged to form an image on a thermal print medium in which a donor element transfers a dye to a receiver element upon receipt of a sufficient amount of thermal energy. This printer includes a plurality of diode lasers which can be individually modulated to supply energy to selected areas of the medium in accordance with an information signal. The printhead of the printer includes one end of a fiber optic array having a plurality of optical fibers coupled to the diode lasers. The thermal print medium is supported on a rotatable drum, and the printhead with the fiber optic array is movable relative to the drum. The dye is transferred by sublimation to the receiver element as the radiation, transferred from the diode lasers to the donor element by the optical fibers, is converted to thermal energy in the donor element.

A direct digital color proofer utilizing a thermal printer such as that just described must be capable of consistently and accurately writing minipixels at a rate of 1800 dots per inch (dpi) and higher to generate half-tone proofs having a resolution of 150 lines per inch and above, as is necessary to adequately proof high quality graphic arts images such as those found in high quality magazines and advertisements. Moreover, it is necessary to hold each dot or minipixel to a density tolerance of better than 0.1 density unit from that prescribed in order to avoid visible differences between the original and the proof. This density control must be repeatable from image-to-image and from machine-to-machine. Moreover, this density control must also be maintained in each of the colors being employed in multiple passes through the proofer to generate a full color image.

As noted in the above-identified application, the fiber optic array is preferably arranged as a linear array which is disposed at an angle with respect to the axis of the rotating drum which carries the writing element used to generate the image. The linear array is disposed at an angle with respect to the drum axis to provide a pitch between adjacent optical fibers, and the mini-pixels written thereby, which is much smaller than the smallest pitch possible between the actual fibers. Inasmuch as the angle of the linear array helps determine the uniformity and the resolution of the generated image, it is necessary to control the angular alignment to within very small tolerances. Such alignment must be simple and must be easily accomplished by the proofing apparatus operator.

Thus it will be seen that a method and apparatus for consistently, quickly and accurately providing the necessary writing beam angular alignment for a digital proofing apparatus would be technologically desirable and economically advantageous.

SUMMARY OF THE INVENTION

According to one embodiment of the present invention, in an imaging apparatus comprising a rotating carrier member arranged to carry a writing element, with the carrier member having an axially extending indicia on the surface thereof, light producing means is provided which is movable with respect to the writing element and is projectable thereon to generate an image. The light producing means is arranged as a linear array in a housing member, with the housing member having an axis disposed substantially perpendicular to the axis of the carrier member. Means is provided for selectively angularly positioning the housing member and the linear array with respect to the carrier member. The positioning means comprises light sensing means disposed on opposite sides of the axis of the housing member in a predetermined relationship with respect to the linear array and facing the carrier member. The light sensing means is arranged to cooperate with the indicia to generate a signal to indicate that the linear array is disposed in a predetermined relationship with respect to the axis of the carrier member as the housing means is selectively rotated about its axis.

According to another embodiment of the present invention, in an imaging system comprising a receiver element upon which an image is written by sublimination of a dye from a donor element under the influence of heat from an optical source, with the donor and receiver elements being superposed in relatively intimate contact on a rotatable drum member, a source of light is movable with respect to the drum member and is arranged to direct a beam of light to the donor element where it is at least partially absorbed to transfer an image to the receiver element. THe light source is arranged as a linear array in a housing member adjacent the drum member, with the housing member having an axis substantially perpendicular to the axis of the drum member. The improvement comprises means for selectively angularly positioning the housing member and the linear array with respect to the drum member. The positioning means comprises means for selectively rotating the housing member about its own axis and a pair of light sensing means disposed on the housing member facing the drum on opposite sides of the axis of the housing member. The linear array is positioned in a predetermined relationship with respect to the light sensing means and the housing member. Indicia means is provided extending axially along the surface of the drum member and is arranged to cooperate with the light sensing means to generate a signal by the sensing means. Means is provided to indicate when both light-sensing means simultaneously generate a signal from the indicia means to indicate that the linear array is disposed in a predetermined angular relationship with respect to the axis of the drum member.

According to yet another embodiment of the present invention, in an imaging apparatus comprising a rotating carrier member arranged to carry a writing element, with the carrier member having an axially extending indicia on the surface thereof, light means is provided which is movable with respect to the writing element and projectable thereon to generate an image. The light- means is arranged as a linear array in a housing member, with the housing member having an axis disposed substantially perpendicular to the axis of the carrier member, and a light. sensing means disposed on opposite sides of the axis of the housing member in a predetermined relationship with respect to the linear array and facing the carrier member. The method of selectively angularly positioning the housing member and the linear array with respect to the carrier member comprising the steps of sensing light reflected from the surface of the carrier member and generating a signal when the axially extending indicia is sensed. Generating a second signal when both light sensing means generate the first signal substantially simultaneously to indicate that the linear array is disposed in a predetermined relationship with respect to the axis of the carrier member.

Various means for practicing the invention and other features and advantages thereof will be apparent from the following detailed description of illustrative, preferred embodiments of the invention, reference being made to the accompanying drawings.

DESCRIPTION OF THE PREFERRED EMBODIMENT

Figure 1:
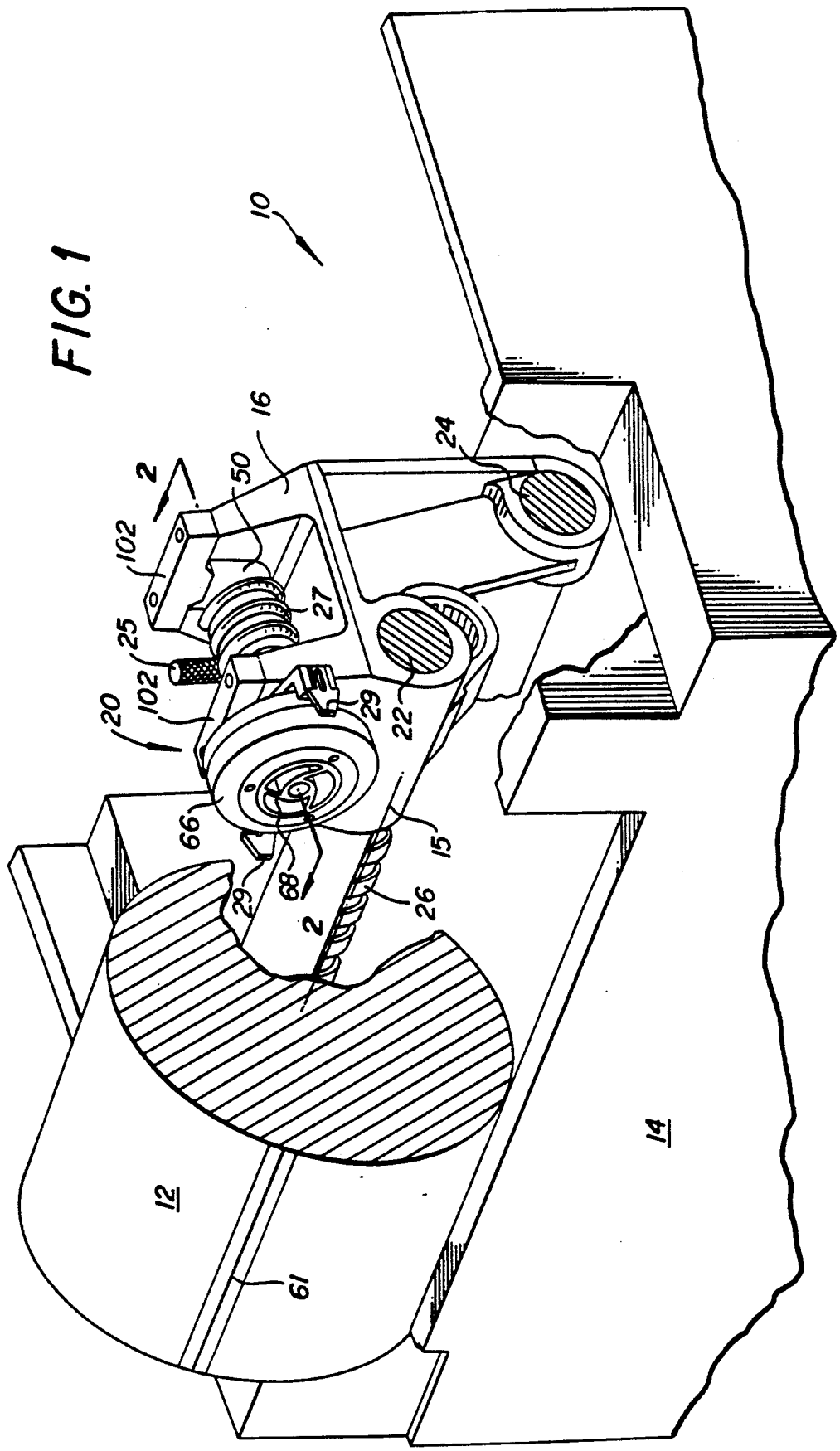
FIG. 1 is a perspective view of the imaging apparatus of the present invention, partially cut-away to reveal hidden portions thereof.

Referring now to FIG. 1, there is shown a thermal printer 10 comprising a drum member 12 mounted for rotation about an axis 15 in frame member 14. The drum member 12 is adapted to support a thermal print medium, not shown, of a type in which a dye is transferred by sublimation from a donor element to a receiver element as a result of heating the dye in the donor. The donor element and the receiver element are superposed in relatively intimate contact and are held onto the peripheral surface of the drum member by means such as by vacuum applied to the superposed elements from the drum interior. A thermal print medium for use with the printer 10 can be, for example, the medium disclosed in U.S. Pa. No. 4,772,582, which includes a donor sheet having a material which strongly absorbs at the wavelength of the exposing light source. When the donor element is irradiated, this absorbing material converts light energy to thermal energy and transfer the heat to the dye in the immediate vicinity, thereby heating the dye to its vaporization temperature for transfer to the receiver element. The absorbing material may be present in a layer beneath the dye, or it may be admixed with the dye wavelengths in the range of 800 nm–880 nm. An example of a preferred embodiment of a receiver element that can be used with the present invention is disclosed in co-pending, commonly assigned U.S. Pat. Application Ser. No. 606,404, entitled Intermediate Receiver Opaque Support, and filed Oct. 31, 1990. The receiver element disclosed therein incorporates a reflective layer which improves the efficiency of the dye transfer to the receiver element.

The light source is movable with respect to the drum member and is arranged to direct a beam of actinic light to the donor element. Preferably the light source comprises a plurality of laser diodes, not shown, which can be individually modulated by electronic signals which are representative of the shape and color of the original image, so that each dye is heated to cause volatilization only in those areas in which its presence is required on the receiver to reconstruct the color of the original object. In the preferred embodiment, the laser diodes are mounted remotely from the drum member 12, on the stationary portion of the frame 14, and each direct the light produced thereby to the input end of a respective optical fiber which extends to and transfers the light to a movable writing head 20 adjacent the drum member. The laser diodes are selected to produce a first beam of light having wavelengths in the range of 800 nm–880 nm, and preferably predominately at a wavelength of 830 nm.

The writing head 20 is moveably supported adjacent drum member 12 and is mounted on a moving translator member 16 which, in turn, is supported for slidable movement on bars 22 and 24. The bars 22 and 24 are sufficiently rigid that they do not sag between the mounting points at their ends and are arranged as exactly parallel with the axis of the drum member as possible. The upper bar 22 is arranged to locate the axis of the writing head precisely on the axis of the drum with the writing head axis perpendicular to the drum axis. The upper bar 22 locates the translator member in the vertical and the horizontal directions with respect to the axis of the drum member. The lower bar 24 locates the translator member only with respect to rotation of the translator about the bar 22 so that there is no overconstraint of the translator which might cause it to bind, chatter, or otherwise impart undesirable vibration to the writing head during the generation of an image. The translator member 16 is driven by means of a motor (not shown) which rotates a lead screw 26 parallel to bars 22 and 24 to move the writing head parallel with the axis of the drum member. The coupling (not shown) which connects the translator member to the lead screw is carefully chosen so that the only force imparted to the translator by the lead screw is parallel to the drum axis.

The writing head 20 is removably mounted on the translator member 16 so that it automatically adopts the preferred orientation with respect to the drum axis note above. The writing head is selectively locatable with respect to the translator, and thus with respect to the drum surface and axis, with regard to its distance from the drum surface, and with respect to its annular position about its own axis. Accordingly, a pair of adjustable locating means are provided to accurately locate the writing head with respect to these two axes on the translator member 16. Only one of the adjustable locating means, a micrometer adjustment screw 25, is illustrated. A torsion and compression spring 27 is provided to load the writing head against these locating means.

The end of the writing head 20 adjacent the drum member 12 is provided with a pair of photosensors 29 aimed at the surface of the drum member. The photosensors may each include an infrared source or they may rely on an outside source of light energy. The photosensors are disposed on diametrically opposite sides of the optical axis of the writing head in a fixed relationship thereto.

Figure 2:
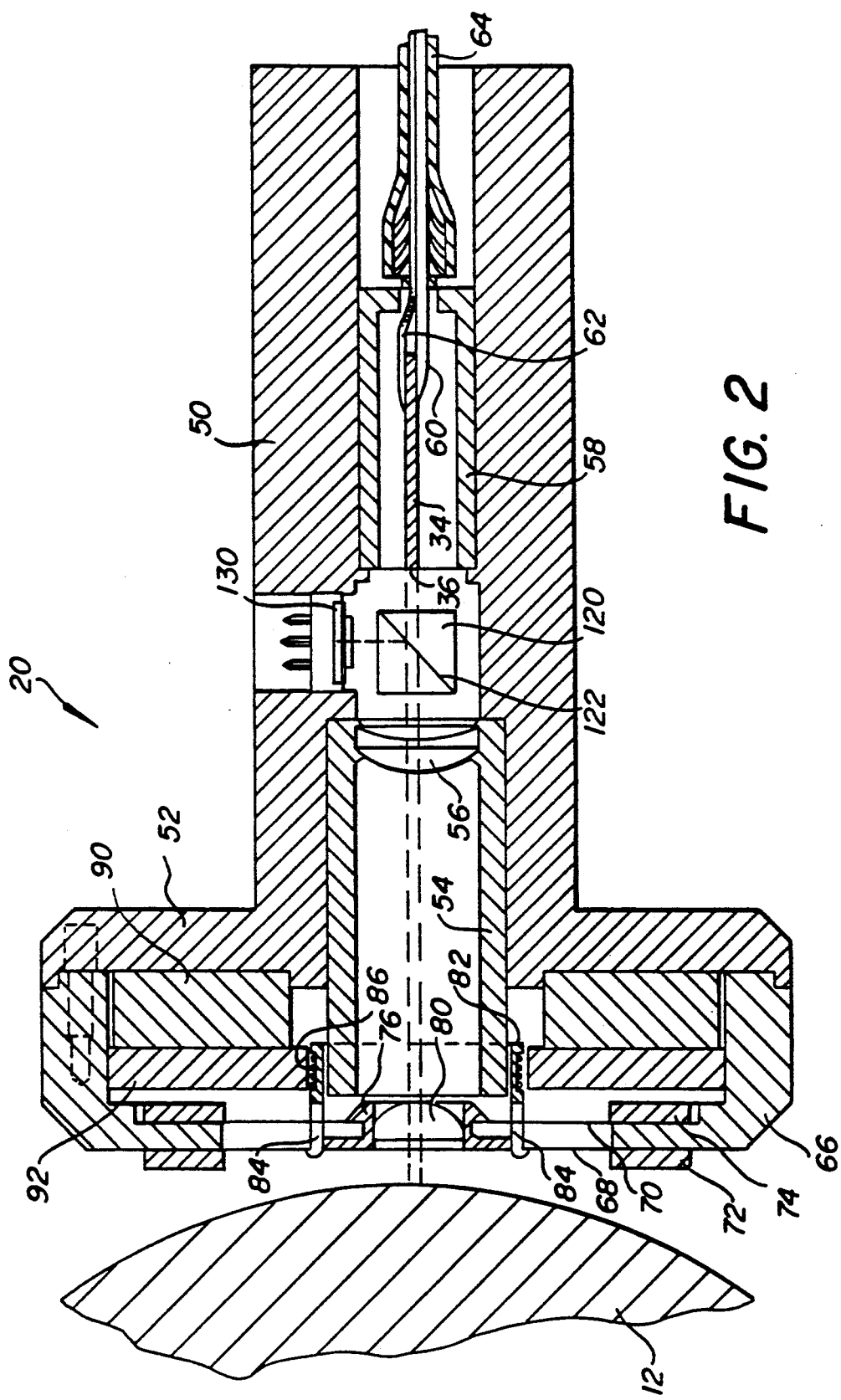
FIG. 2 is a sectional view of the writing head and lens assembly taken along line 2—2 of FIG. 1.

A cross section of the writing head 20 is illustrated in FIG. 2 and comprises a generally cylindrical barrel portion 50 having a flange 52 at the drum end thereof. The interior of the barrel portion is arranged to accept a stationary lens barrel 54 at the writing end, containing a stationary lens 56. A printhead assembly 58 is selectively oriented within and at the opposite end of the barrel from the writing end. The printhead assembly comprises a tubular member 58 which is selectively oriented within barrel portion 50 and contains a linear array of optical fibers. The linear array includes a fiber-supporting wafer 34 and a plurality of optical fibers 60 mounted thereon. The optical fibers have a writing end 36 facing the drum member 12 at the opposite end of the barrel. The optical fibers 60 extend from the end of the printhead assembly and out of the writing head barrel through a protective sheath 64 to the diode lasers, not shown.

A cup-shaped closure member 66 is arranged to mate with the flange 52 of the writing head barrel 50 and forms a housing for the focusing drive means, as will be described hereinbelow. The end of the closure member adjacent drum member 12 is provided with an axially disposed opening which is bridged by a pair of sheet flexure members, 68 and 70, mounted at the outer periphery thereof by annular plate means 72 and 74 to the closure member 66. The central portions of the sheet flexure members are mounted to a movable rigid cylindrical lens housing 76 which contains moveable lens 80. A cylindrical bobbin 82 is disposed around the end of stationary lens barrel 54 and is connected to the moveable lens housing 76 via equally spaced arms 84 which extend between the legs of the flexure members 68 and 70. A voice coil 86 is wound about the cylindrical portion of the bobbin 82 and is connected to a driving circuit, to be further described hereinbelow.

Also enclosed between the end closure 66 and flange 52 is a high power, toroidal magnet 90 and an annular magnetic plate 92 which are both disposed about and spaced from the end of stationary lens barrel 54. The voice coil portion of the bobbin 82 is disposed in the gap between the inner circumference of plate 92 and the outer circumference of stationary lens barrel 54. The dimensions of the magnet, the annular plate, the stationary lens barrel, and the bobbin are such that the bobbin can move freely axially of the lens barrel. The bobbin is supported in the gap by its attachment to the moveable lens housing 76 which is held in position by the plate flexures 68 and 70. It will be noted that the barrel portion 50, flange 52, the stationary lens barrel 54, and annular plate 92, are all formed of magnetic material, such as ordinary steel, so that is combination with the toroidal magnet 90, a strong magnetic field is created between the inner periphery of the annular plate 92 and the end of the stationary lens barrel 54. As a result, when a current is introduced into the voice coil 86 of the bobbin 82, as by a lens focusing circuit (not shown), an axial force is imparted to the bobbin and to the moveable lens housing 76, thereby selectively moving the moveable lens 80 along the optical axis of the assembly.

Thus, with an appropriate focus detection system, to be described hereinbelow, the moveable lens assembly may be driven to assure that the output of the fiber optic array is maintained in focus at the appropriate position on the drum member 12, or or or within the writing element (not shown) mounted thereon.

The fiber optic array (see FIGS. 2 and 3) comprises a plurality of fibers 60 which are each connected to a respective, remotely mounted diode lasers, not shown. The diode lasers can be individually modulated to selectively project light from the writing end 36 of the optical fibers through the lens assembly, consisting of stationary lens 56 and movable lens 80, onto the thermal print medium carried by the drum member 12. The fiber optic array may be of the type shown in co-pending, commonly assigned U.S. Application Ser. No. 451,656, filed Dec. 18, 1989. Each of the optical fibers includes a jacket, a cladding, and a core, as is well known in the art. As disclosed in the copending application, the fibers extend from the laser diodes to the array and are mounted in sets of grooves 100 (FIG. 4) which are formed in the substrate so that the fibers at the writing end 36 are disposed substantially parallel and adjacent to each other in very close proximity, with the ends disposed in a common plane perpendicular to the fiber axes.

Figure 3:
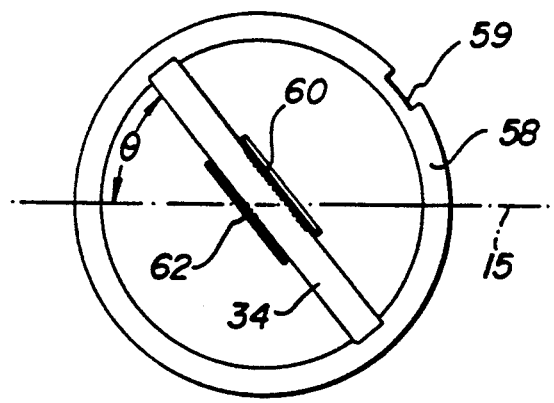
FIG. 3 is an end view of the print head assembly.
Figure 4:
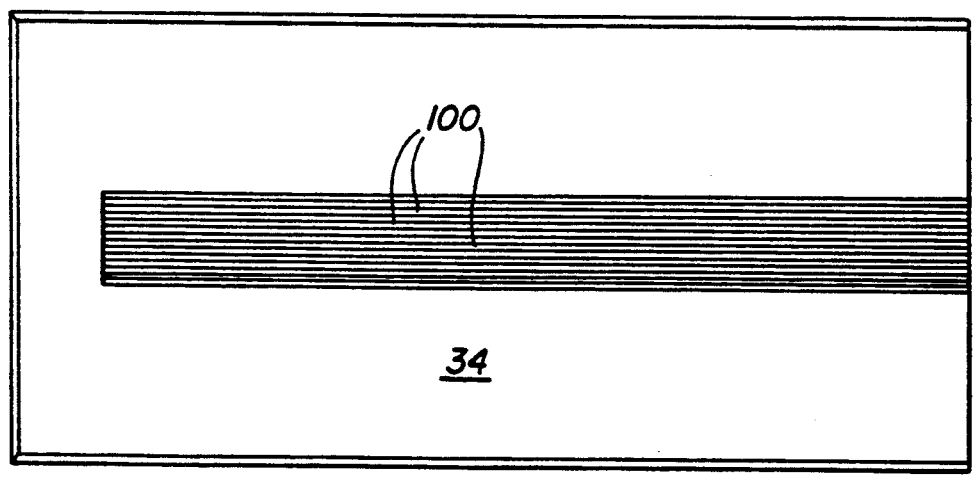
FIG. 4 is a plan view of an optical fiber supporting substrate.

As disclosed in the above co-pending application, the fibers are mounted in the grooves 100 formed in the substrate 34. In a preferred embodiment of the array, twenty writing fibers 60 are employed. As illustrated in FIG. 3, the substrate 30 is disposed in the tubular member of the printhead assembly 58. The tubular member is provided with a keyway 59 which mates with a corresponding key (not shown) on the inner surface of barrel portion 50 so that the orientation of the linear array 60 is at a preselected angle $\theta$ with respect to the drum axis 15. The orientation of the keyway 59 in the outer surface of the printhead assembly 58, the corresponding key on the interior of the barrel portion 50, and the photosensors 29 disposed on diametrically opposite sides of the writing head axis, all correspond so that when a line between the two photosensors 29 is exactly parallel with the axis of drum member 12, the writing angle of the linear array 60, with respect to the axis of the drum member, is that which has been preselected for the present apparatus. The determination of this relationship is relatively simply achieved with the present construction inasmuch as a visible line 61 is provided on the drum surface which is carefully fabricated to be parallel with the drum axis. Accordingly, when the photosensors 29 both detect line 61 simultaneously, the writing head has the proper angular orientation to provide the desired angle of the linear array with respect to the drum axis. Adjustment of the angular positioning of the writing head is equally easy to obtain. Hold down clamps 102, which lock the writing head 20 on the translator member 16, are loosened, and the micrometer adjustment screw 25 is adjusted against a stop on the translator member to rotate the head member against the force of the torsion spring 27, or to permit the torsion spring to rotate the writing head in the opposite direction, should that be necessary. When the photosensors 29 both simultaneously detect line 61, which may be accomplished when the drum is either moving or stationary, with or without the writing element disposed thereon, the desired angle $\theta$ between the linear array and the drum axis is achieved. With this construction it is possible to replace the writing head in the field with a new writing head without requiring elaborate setup or alignment, since the predetermined relationship has already been established between the photosensors 29 and the linear array when the writing head is assembled.

The focus detection system comprises a second array of optical fibers 62 mounted on the opposite surface of the substrate 34 with respect to the writing array 60. The focusing array 62 requires only a single fiber, but in practice, three fibers are provided, with two as extras in case the first fiber fails. The focusing fiber is connected at its inlet end to a laser diode (not shown) which may be mounted in the same region with the writing diodes, but which is selected to produce a second beam of light having a wavelength different from the wavelength of the writing beam and preferably outside the range of 800 nm–880 nm. In the preferred embodiment, the focusing light source produces a beam of light having a predominant wavelength of 960 nm. It has been found that a focusing beam having a wavelength of 960 nm is substantially unabsorbed by all of the various donor dye materials. As a result substantially all of the focusing beam of this wavelength will penetrate the donor material, regardless of the color dye employed, to be reflected from the reflective surface which is part of the receiver element. Inasmuch as this surface has been found to be much closer to the dye layer, where it is desirable to focus the writing beam, than the top surface of the donor layer, it is possible for both the writing beam and the focusing beam to be aimed at more nearly the same surface than is possible if the focusing beam is reflected from the top surface of the donor element. As a result, the focusing lens may have a narrower latitude than would be necessary were the focusing beam and the writing beam to be focused at more widely separated surfaces.

The focus detection system also includes a beam splitter 120, having a semi-reflective buried surface 122, which is disposed between the writing end 36 of the linear array 60 and the stationary lens 56. A spit cell photodetector 130 is disposed in the sidewall of barrel 50 and is arranged to receive the portion of the focusing[beam which is reflected from the writing element and by the buried layer of the beam splitter. The photodetector is provided with a mask to shield the s-lit cell from any part of the writing beam which may be reflected to the photodetector.

ALTERNATIVE EMBODIMENTS

While the preferred embodiment sets forth that the angular adjustment arrangement of the present invention is arranged to sense when the light sensors detect the indicia in the drum member substantially simultaneously to indicate that the linear array is disposed at the preferred angular relationship with respect to the drum axis, it is also possible for the light sensing means to sense the indicia at a predetermined difference in time to indicate that the linear array is disposed at a different angular- relationship with respect to the axis of the drum member.

The invention has been described in detail with particular reference to a presently preferred embodiment, but it will be understood that variation and modifications can be effected within the spirit and scope of the invention.

What is claimed is:

1. In an imaging apparatus comprising a rotating carrier member arranged to carry a writing element, said carrier member having axially extending indicia on the surface thereof, light means movable with respect to said writing element and projectable thereon to generate an image, said light means arranged as a linear array in a housing member, said housing member having an axis disposed substantially perpendicular to the axis of said carrier member, the improvement comprising means for selectively angularly positioning said housing member and said linear array with respect to said carrier member, said positioning means comprising light sensing means disposed on opposite sides of the axis of said housing member in a predetermined relationship with respect to said linear array and facing said carrier member, said light-sensing means arranged to cooperate with said indicia to generate a signal to indicate that said linear array is disposed in a predetermined relationship with respect to the axis of said carrier member as said housing means is selectively rotated about said axis.

2. An imaging system according to claim 1 including means for indicating when both of said light sensing means sense said indicia substantially simultaneously to indicate that said linear array is disposed at a predetermined angle with respect to the axis of said carrier member.

3. An imaging system according to claim 1 including means for indicating when said light sensing means sense said indicia at a predetermined difference in time to indicate that said linear array is disposed at another predetermined angle with respect to the axis of said!carrier member.

4. In an imaging apparatus comprising a rotating drum member carrying a writing element, light means movable with respect to said writing element and projectable thereon to generate an image, said light means being disposed in a housing member and comprising a plurality of light sources arranged in a linear array, means mounted in said housing member for focusing said light sources with respect to said writing element and having an optical axis disposed substantially perpendicular to the axis of said drum member, and means for selectively angularly positioning said housing member and said linear array with respect to said drum member, said positioning means comprising a pair of light sensing means disposed on said housing member facing said drum on opposite sides of said optical axis, said linear array being positioned in a predetermined relationship with respect to said pair of light sensing means and said focusing means, indicia means extending axially along the surface of said drum member arranged to cooperate with said light sensing means to generate a signal by said sensing means, means for selectively rotating said housing member about said optical axis, and means for indicating a signal from said indicia means to indicate that said linear array is disposed in a predetermined relationship with respect to the axis of said drum member.

5. An imaging system according to claim 4 including means for sensing when said light sensing means sense said indicia are predetermined difference in time to indicate that said linear array is disposed at another predetermined angle with respect to the axis of said!carrier member.

6. In an imaging system comprising a receiver element upon which an image is written from a donor element by a light source, said donor and receiver elements being superposed on a rotatable respect to said drum member and arranged to direct a beam of light to said donor element where it is at least partially absorbed to transfer an image to said receiver element, said light source being arranged at a linear array in a housing member adjacent said drum member, said housing member having an axis substantially perpendicular to the axis of said drum member, the improvement comprising:

means for selectively angularly positioning said housing member and said linear array with respect to said drum member, said positioning means comprising a pair of light sensing means disposed on said housing member facing said drum on opposite sides of said housing member axis, said linear array being positioned in a predetermined relationship with respect to said light sensing means and said housing member, indicia means extending axially along the surface of said drum member arranged to cooperate with said light sensing means to generate a signal by said sensing means, means for selectively rotating said housing member about said housing member axis, and means for indicating when both light sensing means simultaneously generate a signal from said indicia means to indicate that said linear array is disposed in a predetermined relationship with respect to the axis of said drum member.

7. An imaging system according to claim 6 wherein when said light sensing means sense said indicia at a predetermined difference in time to indicate that said linear array is disposed at another predetermined angle with respect to the axis of said carrier member.

8. In an imaging system comprising a receiver element upon which an image is written by sublimination of a dye from a donor element under the influence of heat from an optical source, said donor and receiver elements being superposed in relatively intimate contact on a rotatable drum member, a source of light movable with respect to said drum member and arranged to direct a beam of light to said doner element where it is at least partially absorbed to transfer an image to said receiver element, said light source being arranged as a linear array in a housing member adjacent said drum member, said housing member having an axis substantially perpendicular to the axis of said drum member, the improvement comprising:

means for selectively angularly positioning said housing member and said linear array with respect to said drum member, said positioning means comprising means for selectively rotating said housing member about its own axis arise a pair of light sensing means disposed on said housing member facing said drum on opposite sides of the housing member axis, said linear array being positioned in a predetermined relationship with respect to said light sensing means and said housing member, indicia means extending axially along the surface of said drum member arranged to cooperate with said light sensing means to generate a signal by said sensing means, and means for indicating when both light sensing means simultaneously generate a signal from said indicia means to indicate that said linear array is disposed in a predetermined angular relationship with respect to the axis of said drum member.

9. In an imaging apparatus comprising a rotating carrier member arranged to carry a writing element, said carrier member having axially extending indicia on the surface thereof, light means movable with respect to said writing element and projectable thereon to generate an image, said light means arranged as a linear array on a housing member, said housing member having an axis disposed substantially perpendicular to the axis said carrier member, light sensing means disposed on opposite sides of the axis of said housing member in a predetermined relationship with respect to said linear array and facing said carrier member, the method of selectively angularly positioning said housing member and said linear array with respect to said carrier member comprising the steps of sensing light reflected from the surface of said carrier member and generating a signal when said axially extending indicia is sensed, and generating a second signal when both light sensing means generate said first signal simultaneously to indicate that said linear array is disposed in a predetermined relationship with respect to the axis of said carrier member.

10. An imaging system according to claim 9 including the step of selectively rotating said housing means about its own axis while sensing said light reflected from the surface of said carrier member.

11. An imaging system according to claim 9 including the step of indicating when said light sensing means sense said indicia at a predetermined difference in time to indicate that said linear array is disposed at another predetermined angle with respect to the axis of said carrier member.

* * * * *